United States Patent [19]

Mandl et al.

[11] 4,353,667
[45] Oct. 12, 1982

[54] METHOD OF AND APPARATUS FOR MAINTAINING SUBSTANTIALLY CONSTANT A QUANTITY OF OPENED FIBROUS MATERIAL

[75] Inventors: Gerhard Mandl, Brütten; Robert Moser, Winterthur; Rudolf Wildbolz, Winterthur, all of Switzerland

[73] Assignee: Rieter Machine Works Ltd., Winterthur, Switzerland

[21] Appl. No.: 828,037

[22] Filed: Aug. 26, 1977

Related U.S. Application Data

[63] Continuation-in-part of Ser. No. 497,617, Aug. 15, 1974, abandoned.

[30] Foreign Application Priority Data

Aug. 22, 1973 [CH] Switzerland ............... 12044/73

[51] Int. Cl.³ .......................................... B65G 53/66
[52] U.S. Cl. ................................. 406/29; 406/30
[58] Field of Search .................. 302/21, 22, 28, 35, 302/37, 40, 42, 66; 19/105, 205, 156.3; 137/12; 406/29, 30

[56] References Cited

U.S. PATENT DOCUMENTS

| | | | |
|---|---|---|---|
| 2,898,158 | 8/1959 | Pollock | 302/42 |
| 3,108,332 | 10/1963 | Moss et al. | |
| 3,163,329 | 12/1964 | Mornas | 406/30 X |
| 3,268,266 | 8/1966 | Brown | 406/30 |
| 3,403,941 | 10/1968 | Solt | 302/42 |
| 3,414,330 | 12/1968 | Trutzschler | 302/28 |
| 3,552,800 | 1/1971 | Truetzschler | 302/40 |
| 3,767,268 | 10/1973 | Stucky | 302/40 |
| 4,059,310 | 11/1977 | Waskiewicz et al. | 302/42 |

FOREIGN PATENT DOCUMENTS

| | | | |
|---|---|---|---|
| 1199574 | 12/1959 | France | |
| 999635 | 7/1965 | United Kingdom | 302/42 |
| 1155487 | 6/1969 | United Kingdom | |
| 326117 | 2/1972 | U.S.S.R. | 302/42 |

*Primary Examiner*—Jeffrey V. Nase
*Attorney, Agent, or Firm*—Werner W. Kleeman

[57] ABSTRACT

A method of, and apparatus for, maintaining substantially constant a quantity of opened fibrous material delivered per unit of time, to a spinning preparatory machine, wherein a conveying air stream is generated by means of a fan operating at a given point on its characteristic diagram, the conveying air stream is delivered into a transporting duct for the fibrous material, and the fibrous material is supplied into the transporting duct. The supplied fibrous material within the duct is accelerated by means of the conveying air stream, and the accelerated fibrous material is delivered within the duct in the direction of the spinning preparatory machine. There is determined the operating condition of the fan by measuring a parameter which is characteristic for the operation condition of the fan and depending on the quantity of fibrous material accelerated, the measured parameter is compared with a parameter corresponding to a desired quantity of opened fibrous material which is to be delivered per unit of time to the spinning preparatory machine, and upon deviation of the measured parameter from the set value parameter there is adjusted the further supply of fibrous material into the transporting duct until re-establishing a supply of fibrous material to said spinning preparatory machine corresponding to the substantially constant quantity of opened fibrous material desired to be delivered to the spinning preparatory machine.

7 Claims, 11 Drawing Figures

METHOD OF AND APPARATUS FOR MAINTAINING SUBSTANTIALLY CONSTANT A QUANTITY OF OPENED FIBROUS MATERIAL

CROSS-REFERENCE TO RELATED CASE

This is a continuation-in-part application to our commonly assigned, copending U.S. application, Ser. No. 497,617, filed Aug. 15, 1974, now abandoned.

BACKGROUND OF THE INVENTION

The present invention relates to a new and improved method of measuring a characteristic value essentially corresponding to a quantity of opened fibres which is being transported in an air stream to a spinning preparatory machine and controlling the supply of opened fibrous material into the air stream, and further pertains to an improved construction of apparatus for implementing the aforesaid method.

It is already known to the art to measure the volume or the weight, respectively, of pneumatically transported bodies, particularly opened fibre flocks, by means of optical scanning or measuring operations. From the electrical signals which are generated as the flocks individually pass through a light beam of the scanning or measuring device, and the duration of which signals corresponds to the duration of the interruptions of the light beam, it is possible to derive the fibre weight after suitable transformation of electrical pulses. This technique presupposes that the bodies or the fibre flocks, as the case may be, do not pass through the duct cross-section simultaneously but individually in succession, since e.g. two overlapping flocks interrupt the light beam in the same manner as one single flock of corresponding size. This method furthermore requires that the flocks are statistically evenly distributed in the transporting duct in order to obtain a value representative of the total through passing quantity of fibre flocks and which can be used for controlling the flock material supply. With this technique too high a transporting speed also can detrimentally influence the measurement, since then the duration of the interruptions become too brief and owing to the inertia of the scanning or measuring device no longer can be sufficiently precisely detected. These restrictive requirements thus only permit determination of the effective production, i.e. the quantity of fibrous material transported per time unit, with limited precision and which is insufficient for certain applications which occur in spinning preparatory plants where there is required the highest precision.

Furthermore, there is known to the art a random-laid web card on which there is produced a web or lap of uniform density. The fibrous material delivered by two clothing-covered rolls is taken-off the last clothing-covered roll by means of a tangential air stream and is transferred via a duct to a rotating perforated suction drum arranged immediately after the clothing-covered roll, the air flowing-off via the deposited web to the interior of the perforated drum. In the section of the duct located between the clothing-covered roll and the perforated drum, and in which duct section the web is already partially formed, there is arranged a pressure measuring device. Pressure variations caused by the varying web density are detected by this pressure measuring device and the speed of the supply rolls feeding the clothing-covered rolls with fibrous material is controlled as a function of the change in pressure, i.e. the web density. The measuring device in this case thus detects a change in the aerodynamic characteristics of the air stream which depends upon the penetration resistance of the air stream through the material already deposited on the perforated drum, i.e. upon the density of such material. This device is therefore associated with the drawback that it is not possible to determine the quantity of material which is being transported.

In British Pat. No. 1,206,610, there is taught a valve for a pneumatic unloading and loading device for pulverulent material (cement), by means of which there can be adjusted or set a desired air-material mixture as a function of the kinetic conditions prevailing in the pneumatic transport duct. The material infeed to the transporting air stream occurs in this case as a function of the pressure difference of the transporting air stream and thus the air throughput, this pressure difference prevailing at a throttle. The greater the air throughput that much more material is supplied and vice versa, so that with varying air throughput there is always maintained one and the same desired air-material-mixture. A predetermined and constant production of material cannot be realized with this prior art equipment, since the quantity of material likewise alters during a change of the air throughput.

Now in French Pat. No. 1,199,574, it is known from the ironworks industry, to deliver pre-determined quantities of lime powder and oxygen for refining a metal melt, wherein there is adjusted a gas pressure corresponding to the desired quantity of lime and in order to maintain the desired powder-oxygen-mixture constant. Since a desired quantity of pulverulent lime can be obtained by adjusting the gas pressure, in order to realize a desired gas-material-mixture, it is not possible to achieve a predetermined and constant production of material, if, with a gas pressure which has been once set, the arriving material quantity changes.

SUMMARY OF THE INVENTION

Hence, it is a primary object of the present invention to eliminate the disadvantages of the state-of-the-art methods for measuring the weight of fibrous material and to measure with a high degree of precision the total quantity of an opened fibrous material being transported by an air stream to a spinning preparatory machine independently of its speed and distribution in the air stream and to provide a measuring value corresponding to this total quantity which is used for controlling the production of fibrous material.

A further object of the present invention aims at the provision of an apparatus equipped with a transporting duct for pneumatically transporting fibrous material and constructed in such manner that a measuring device measures a characteristic value corresponding to the quantity of fibrous material undergoing transport and which can be delivered to a device controlling the supply production of fibrous material.

The method for maintaining substantially constant a quantity of opened fibrous material delivered per unit of time, to a spinning preparatory machine, comprising the steps of:

(a) generating a conveying air stream by means of a fan operating at a given point on its characteristic diagram, (b) delivering the conveying air stream into a transporting duct for the fibrous material, (c) supplying the fibrous material into the transporting duct, (d) accelerating the supplied fibrous material within the duct by means of the conveying air stream, (e) delivering the accelerated fibrous material within the duct in the direction of the spinning preparatory machine, (f) determining the operating condition of the fan by measuring a parameter which is characteristic for the operation condition of the fan and depending on the quantity of fibrous material accelerated, (g) comparing the measured parameter with a set value parameter corresponding to a desired quantity of opened fibrous material which is to be delivered per unit of time to the spinning preparatory machine, and (h) upon deviation of the measured parameter from the set value parameter adjusting the further supply of fibrous material into the transporting duct until re-establishing a supply of fibrous material to said spinning preparatory machine corresponding to the substantially constant quantity of opened fibrous material desired to be delivered to the spinning preparatory machine.

Apparatus for maintaining substantially constant a quantity of fibrous material which is in the process of being transported by an air stream and delivered per unit of time to a spinning preparatory machine, comprises:

(a) a pneumatic transporting duct;

(b) a fan operatively connected with the pneumatic transporting duct for generating an air stream moving through the pneumatic transporting duct;

(c) a supply device for feeding fibrous material into the transporting air stream;

(d) said transporting duct comprising an acceleration zone for the fibrous material, the one end of the acceleration zone being in communication with the fan;

(e) a measuring device arranged for measuring a parameter which is characteristic for the operation condition of the fan and depending on the quantity of the fibrous material accelerated per unit of time;

(f) a control device operatively connected with the supply device and said measuring device;

(g) the control device including means for producing a value by comparing the measured parameter with a set value parameter corresponding to a desired quantity of opened fibrous material which is to be delivered per unit of time to the spinning preparatory machine and for adjusting the further supply of fibrous material into the transporting duct in dependence upon said value until re-establishing a supply of fibrous material to said spinning preparatory machine corresponding to the substantially constant quantity of opened fibrous material desired to be delivered to the spinning preparatory machine.

As the fibrous material is accelerated energy is transferred from the air stream to the fibrous material. If e.g. a certain quantity of fibrous material is accelerated per unit of time, then a certain amount of energy i.e. work or power is transferred to the fibrous material within the same unit of time. The magnitude of this work or power depends upon the quantity of fibrous material transported per unit of time, i.e. on the supply production of fibrous material. As the power can be determined using the static and/or the dynamic pressure of the air stream, there occurs a change in the static and/or the dynamic pressure, as this power is transferred from the air stream to the fibrous material, which change depends upon the supply production of fibrous material.

As the change in the static and/or the dynamic pressure, i.e. the aerodynamic characteristics occurs at the point or location of the acceleration and as this change of pressure can be propagated in the air stream up to the point where the air stream is generated, this change in the static and/or the dynamic pressure between the point or location of generation of the air stream and the point of acceleration can provide a measuring of measurement value representing a measure of the production. The air stream in this arrangement can be generated by any pressure or suction source.

A correlation between the change in the static pressure caused by the acceleration and the production, as can be mathematically derived, is represented by the following equation:

$$\Delta p = \frac{1}{2g} \cdot \frac{V_L}{f_L} \cdot P$$

where:

$\Delta p$ is (in kiloponds per square meter) the change in pressure caused by the acceleration of the fibrous material between a point of the generation of the air stream and a point of the acceleration of the fibrous material, $V_L$ is the speed of the air to which the fibrous material is accelerated (in meters per second), $f_L$ is the cross-sectional area of the air stream at the speed $V_L$ (in square meters), g is the gravitational acceleration (in meters per second square), and P is the production of fibrous material (in kiloponds per second).

From the measurement of the change in pressure $\Delta p$ it is thus possible to determine the production P, the values $V_L$ and $f_L$ being given. In the same manner an equation also can be derived representing the correlation between the change in dynamic pressure caused by the acceleration and the production. Thus, the dynamic pressure can be measured at a selected location between the point of generation of the air stream and either the point of first acceleration of the fibre material (when fibre infeed is downstream of the fan) or the point where such acceleration is complete (when fibre infeed is upstream of the fan): the change in dynamic pressure caused by infeed of fibre material can be sensed and hence production can be determined. In each of these cases a measuring value can be derived from the change in the static and/or the dynamic pressure caused by the acceleration of the fibrous material, which value is a measure of the production and which can be used as a control value. If the air stream is generated e.g. by a fan or ventilator, the power or work needed for accelerating the fibrous material is furnished by this ventilator and can be determined by an operating point of the ventilator on its characteristic graph or diagram. As described above, the magnitude of this power depends upon the production (i.e. the quantity transported) of fibrous material, the operating point of the ventilator thus being influenced by the production. A change of the static and/or the dynamic pressure of the air stream caused by the acceleration of the fibrous material thus e.g. shifts the point of operation of the ventilator on its corresponding characteristic line to an extent corresponding to the power transferred to the fibrous material and thus corresponding to the production of fibrous material. The shift in the point of operation of the ventilator or fan which depends upon the change of the pressure thus can provide a measuring value which is a measure of the production and which also can be used as a control value.

Mathematically an equation also can be derived which provides a correlation between the shift in the point of operation of the ventilator caused by the acceleration of the fibrous material and the production. As the point of operation of the ventilator of fan corresponds to aerodynamic values and to a determined magnitude of power and a determined magnitude of the driving momentum, a change of these values can be measured by measuring the shift in the point of operation of the ventilator and can be used for measuring or controlling, respectively, the production. Since a change in the static and/or of the dynamic pressure, i.e. the shift of an aerodynamic characteristic value of the ventilator, corresponds to the change in the static and/or the dynamic pressure of the air stream, the aerodynamic characteristic values of the point of operation of the ventilator can be measured in the air stream and, as described above, according to the correspondinglyy derived equations for these measuring values can be used for controlling the production. Also, however, based upon the shift of the point of operation of the ventilator it is possible to measure the change in the driving moment, e.g. the torque of the fan, or the change in the electrical power takeup of an electric motor driving the fan. Based upon correspondingly derived equations these measuring values also can be used for measuring, or for controlling, respectively, the production.

In one arrangement the fibrous material can be accelerated by an air stream in which there prevails a pressure above atmospheric pressure, and by appropriately arranging the measuring device or feeler there can be measured a characteristic value altered by the change in the static and/or the dynamic pressure, as seen in the direction of the air stream flow, not earlier than at the point where the air stream is generated and at the latest at the point where the fibrous material is accelerated, e.g. at the latest at the point where the acceleration is initiated. In another arrangement the fibrous material can be accelerated by an air stream in which there prevails a pressure below the atmospheric pressure and by appropriately arranging the measuring device there can be measured the characteristic parameter altered by the change in the static and/or the dynamic pressure, as seen in the direction of the air stream flow, at the earliest at the point of acceleration of the fibrous material, e.g. at the earliest at the point where the acceleration is completed and at the latest at the point where the air stream is generated.

Since, for instance, the static and/or the dynamic pressures are auxiliary characteristic values rather than the characteristic parameter of primary interest, which can permit the determination of the production, changes in other characteristic values than those of the static and/or dynamic pressure caused by the acceleration of the fibrous material can influence the relationships in the corresponding equation and thus can falsify the auxiliary characteristic value and thus the characteristic parameter to be measured. This can be the case, if, for example, the coefficient of friction of the fibrous material in the duct or the rotational speed of the ventilator are changing as a function of time or the static and/or the dynamic pressure are additionally changing as a function of time due to a change in pressure which does not result from the acceleration of the fibrous material. The falsification of the auxiliary characteristic value can be avoided, if parameters leading to the falsified result can be, for instance, maintained constant or can be taken into account in the corresponding equations or in additionally measuring the falsifying influences for correspondingly adapting the control value. If, for instance, the static pressure is to be measured as the characteristic parameter, at a given point the cross-sectional area and the dynamic pressure, i.e. the speed of the air stream accelerating the fibrous material is preferably to be given or maintained constant. Inversely, if the dynamic pressure is to be measured, at a given point the static pressure is preferably to be given or maintained constant. An additional pressure falsifying the auxiliary characteristic value can be avoided, if, for instance, at the point where the acceleration begins there prevails only, or, respectively, substantially only, the static pressure of the pressure difference, by means of which the air stream is transported. This can be achieved, for instance, in such manner that the air stream with the fibrous material is transported by a pressure difference, at which for example in the case of an air stream in which there prevails a pressure above the atmospheric pressure, there is maintained constant the lower pressure for transporting, and for instance in the case of an air stream in which there prevails a pressure below the atmospheric pressure there is maintained constant the higher pressure for transporting.

In one arrangement the transporting duct can merely extend over the zone or distance of acceleration in such manner that for instance there is provided an acceleration duct, one end of which is connected to the device generating the air stream and the other end of which can merge into the air of the surrounding room in which there prevails atmospheric pressure. If there is generated in this arrangement for instance a pressurized air stream then there prevails the constant lower pressure, as seen in the direction of the air stream flow, at the end of the acceleration zone and the air stream and the fibrous material are transported in a direction towards the constant pressure. If the fibrous material is for instance aspirated via a fan or ventilator, at the suction side of which there is connected for instance the acceleration duct, then in this arrangement there prevails the constant higher pressure, as seen in the direction of the air flow, at the beginning of the acceleration zone. In the first of the above-mentioned arrangements the static and/or the dynamic pressure at the end of the acceleration zone can drop to the pressure of the surrounding atmosphere. In the second of the above-mentioned arrangements the suction can start from a constant higher pressure and the static and/or the dynamic pressure at the end of the acceleration zone can drop to the pressure prevailing in the suction air stream.

Opposite to the free end of the acceleration duct in which there prevails a pressure above atmospheric pressure there also can be arranged an end of a conduit or duct which is preferably coaxially arranged with respect to and at a distance from the acceleration duct, said distance permitting a disturbance-free flow of the fibrous material from the acceleration duct into such conduit or duct. With this arrangement the end of the duct can possess a cross-sectional area which is larger than the cross-sectional area of the free end of the acceleration duct. In this case there is provided an interrupted transporting duct in which there likewise prevails at the end of the acceleration zone atmospheric pressure i.e. a constant lower pressure. The transporting duct or parts thereof as well as the acceleration duct can possess any desired cross-section, e.g. a round or a rectangular cross-section.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
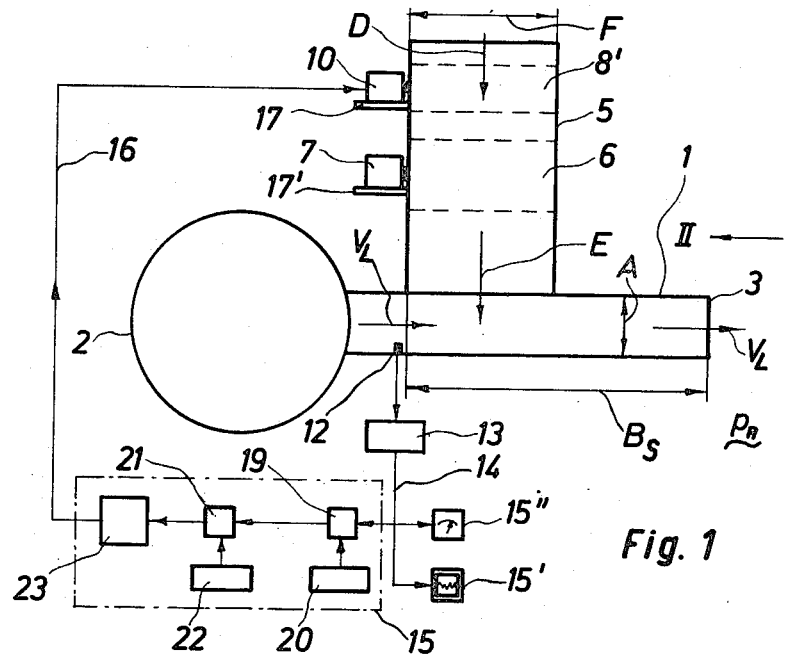
FIG. 1 is a schematic view of an apparatus for measuring or controlling respectively, fibre production.
Figure 2:
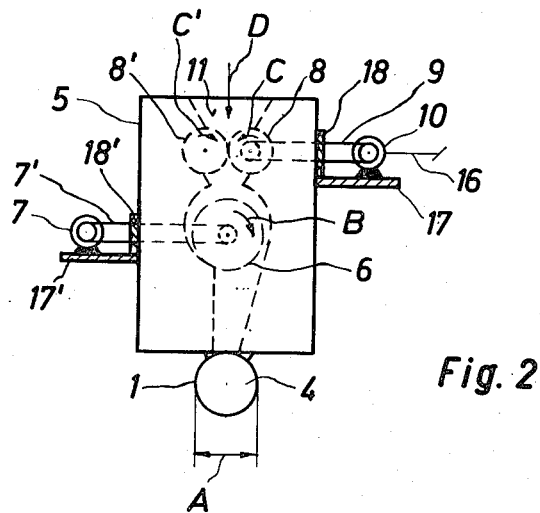
FIG. 2 illustrates the apparatus shown in FIG. 1 looking in the direction of the arrow II.

According to FIGS. 1 and 2 a device 2 is operatively connected to a pneumatic transporting duct 1 and which device 2 generates an air stream flowing through the transporting duct 1 at a certain speed in a direction indicated by the arrow $V_L$. The transporting duct 1 may be constructed as a cylinder possessing a substantially circular cross-section and of a diameter A. This duct or conduit 1 is open at its free end 3 so that the air stream flows out at the speed $V_L$ into the surrounding atmosphere or air where there prevails the atmospheric pressure $p_A$. Furthermore, a device 5 is connected to the transporting duct 1 and serves for opening and supplying opened fibrous material into the transporting duct 1. This opening and supplying device or means 5 comprises an opening roll 6 (FIG. 2), for example in the form of a beater roll. The roll 6 is rotated by a suitable drive motor 7 through the agency of a drive belt 7' in the sense of rotation indicated by the arrow B. Above the opening roll 6 there is arranged a pair of supply rolls 8, 8' which also prevents an exchange of air between the transporting duct 1 and the surroundings via the supply device 5. As concerns the supply rolls only the roll 8 is driven via a drive chain 9 or equivalent structure by means of a drive motor 10 in the sense of rotation indicated by arrow C. The supply roll 8' can be driven by virtue of its contact with the roll 8. For the input or charging with fibrous material the supply device 5 is provided in its upper part with an opening 11. The drive motors 7 and 10 are rigidly mounted on a fixed frame 17 and 17' respectively, at which there are also mounted the supply device 5 and the transporting duct 1 via the support members 18, 18'.

A sensor 12 for measuring the static pressure is arranged in the transporting duct or conduit 1 at any point or location as seen in the direction of the air flow $V_L$, between the device or means 2 for generating the air stream and the supply device 5. This sensor or feeler 12 is operatively connected with a measurement transducer 13 which, if e.g. a pneumatic tube is used as the sensor 12, can be a pressure gauge box. By means of a conductor or line 14 the transducer 13 is connected with a recording or chart-plotting instrument 15', a display or indicator instrument 15" and a control or regulating device 15 which processes and evaluates the signals transmitted by the transducer 13 and via a conductor 16 controls the drive motor 10, the rotational speed of which determines the drive speed of the supply roll 8. The control device 15 contains at its input a null point- or zero-comparator 19 with a zero-setting device 20, followed by a set point or reference value comparator 21 with a setting device 22 for the reference value or set point and furthermore contains a regulator or control 23. If necessary, the regulator or control 23 can contain an amplifier (not shown).

The described apparatus functions as follows:

At first no fibrous material is supplied. As, for better clarity, the air stream is assumed to flow at the constant speed $V_L$ through the transporting duct 1 and at its end 3 there prevails atmospheric pressure $p_A$, i.e. a constant pressure, the static pressure in the transporting duct 1, if no fibrous material is being supplied, is substantially determined by the friction of the air in the transporting duct 1. The sensor or feeler 12 measures this static pressure which is then transformed by the measuring transducer 13. The measuring transducer 13 transmits the transformed signals to the recording or chart-plotting instrument 15', to the display or indicator instrument 15" and to the zero-comparator 19 which compares this measured signal i.e. magnitude with a zero-value set in the zero-setting device 20 and transmits a value $p_0=0$ for the production $p=0$ to the comparator 21 for the set point or reference value. The set point $p_1 > p_0$ for a desired production $P_1 > P_0$ previously set at the setting device 22 is compared in the set point comparator 21 with the value $p_0$. The value of the difference from the desired production $P_1$ is transmitted as a signal to the control or regulator 23 which generates an adjusting or adjustment magnitude which activates the drive motor 10 in such a manner that the supply rolls 8 and 8' are rotated. Fibrous material fed through the opening 11 into the supply device 5 in the direction of the arrow D is supplied by the supply rolls 8 and 8' to the opening roll 6 which also is in operation and which then opens the fibrous material into fibre flocks which are supplied in the direction of the arrow E into the transporting duct 1 by dropping them therein. The fibre flocks entering the air stream at the point of supply at a speed of $V_O=0$ are entrained by the air stream and are accelerated over a zone or distance of acceleration $B_S$ up to the speed of the air $V_L$ and depart at this speed from the transporting duct 1. Owing to the acceleration of the fibrous material there is present an increase in the static pressure compared to the static pressure when no fibrous material is supplied and which increased static pressure is detected by the sensor 12. If the other parameters of the transport system are maintained constant, this change in the static pressure is only brought about by the acceleration of the fibrous material and thus according to the previously considered equation is a measure of the production of supplied fibrous material.

The value or magnitude now transmitted by the measuring transducer 13 is compared in the set point comparator 21 with the desired value $p_1$ by forming the difference of the two values, the resulting value or magnitude corresponding to the change in the static pressure of the air stream and depending upon the production i.e. the amount of fibrous material which has been supplied. With the continuous supply of fibrous material into the transporting or transport duct 1 the speed of the drive motor 10 is changed until the value of the difference generated in the control device 15 to the desired value $p_1$ or $P_1$ respectively, becomes zero. Then the signal at the input of the control or regulator 23 also becomes zero and the drive motor 10 continues rotating at the speed it has then attained as long as the static pressure, or the production or fibre supply respectively, remains unchanged, i.e. the supply rolls 8 and 8' continue rotating at the corresponding circumferential speed. In this manner the production or supply of fibrous material can be controlled as a function of the change of the static pressure, and it will be recalled such change is caused by the acceleration of the fibrous material. By means of the indicator or display instrument 15'' there are displayed the changes in the static pressure. Since the transporting duct 1 according to the embodiment of FIG. 1 ends after the acceleration zone or region $B_S$, the transporting duct 1 corresponds to an acceleration tube of the length $B_S$ of the acceleration zone. The length $B_S$ and thus the length of the acceleration tube 1 is chosen, for instance, such that the fibre flocks have substantially reached the speed of the air $V_L$ at the latest at the end of the accleration zone $B_S$.

Since the fibrous material is not, as assumed above for an idealized arrangement, exclusively transferred into the air stream at the point indicated by the arrow E, rather is distributed more or less unevenly over a length F of the fibrous material-supply zone, as viewed in the direction of the air flow $V_L$, the acceleration of the fibre flocks transferred into the air stream thus occurs at different points along the length F. The sensor or feeler 12 is thus arranged upstream of the zone or area F for the infeed or supply of the fibrous material in such manner that there is measured the entire change after the occurrence of the acceleration. However, it is to be understood the sensor 12 also could be arranged in the zone F of the supply transfer, or in the zone of the setting-in of the acceleration respectively. Since, however, the change in the static pressure caused by the acceleration decreases along the acceleration zone $B_S$ according to the degree with which the fibre flocks have reached the speed of the air $V_L$ the total change after the occurrence of the acceleration in this case no longer could be detected. The sensor 12 is thus advantageously arranged, as viewed in the direction of flow, at the latest at the point of the setting-in or occurrence of the acceleration, i.e. upstream of the point of the infeed of the fibrous material, as shown.

Figure 3:
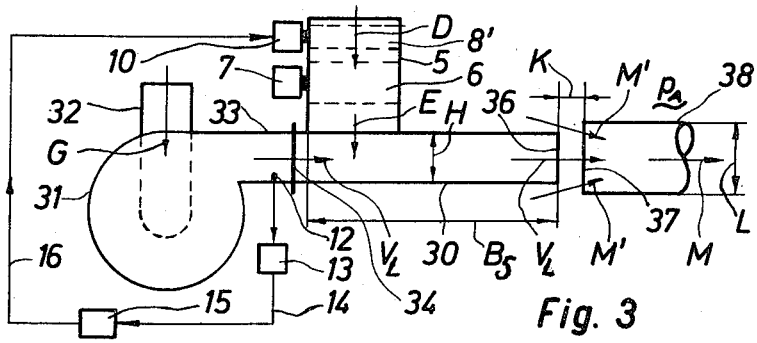
FIG. 3 illustrates an alternative embodiment of apparatus for measuring and controlling fibre production again shown in schematic view.

In the arrangement of FIG. 3 wherein the same parts as shown in FIG. 1 have been designated with the same reference characters, a ventilator or fan 31 connected to an acceleration tube 30 sucks in air through a suction connection or stud 32 in the direction of the arrow G into the adjoining acceleration tube 30 which is connected with a connecting stud 33 by means of a flange 34. The cylindrical acceleration conduit or duct 30 of circular cross-section (diameter H) again merges with its free end 36 with the surrounding air. Opposite to the free end 36 of the duct 30 and arranged coaxially at a distance K is an end 37 of a further duct or pipe conduit 38 which is exposed to a suction action and the diameter of which is indicated by reference character L, this diameter L being larger than the diameter H so that air from the surrounding room is sucked into the duct 38 according to the arrows M'. The fibrous material is again transferred in this case into the acceleration duct or conduit 30 in the direction of the arrow E. The fibrous material leaving the duct 30 is entrained and further conveyed by the suction air stream M.

The distance K between the duct or conduit ends 36 and 37 is chosen to be of such magnitude that there cannot occur any disturbances at the duct ends 36 and 37 and no falsification of the measurement of the static pressure by the sensor 12, and that, on the other hand, there is ensured for the further transport of the fibrous material.

The relationships given in the above-mentioned equation, i.e. the correlation between the change in the static pressure caused by the acceleration and in the production thus remains ensured.

Since a shift in the point of operation of the fan or ventilator 31 along the characteristic line is caused by the change in this static pressure, this shift is indirectly detected by the sensor 12 and the value of this shift is transmitted to the control device 15 by the measuring transducer 13. Just as was the case described with reference to FIG. 1 there is generated by the control device 15 from the transformed measuring or regulation value a magnitude or value which is dependent upon the production or supply of fibrous material and by means of which there is delivered an adjustment magnitude if the production deviates from a set or reference value. By means of such adjustment magnitude it is possible to change by means of the line 16 the speed of the motor 10 and thus the infeed or supply of fibrous material by the rolls 8 and 8'. In this manner the production or fibre supply also can be controlled in this embodiment. The nature of the shift of the operating point in this arrangement not only depends upon the magnitude of the change in production, but also upon the characteristic line of the employed ventilator or fan 31 to which the operating point conforms as such will be described in greater detail hereinafter.

Figure 4:
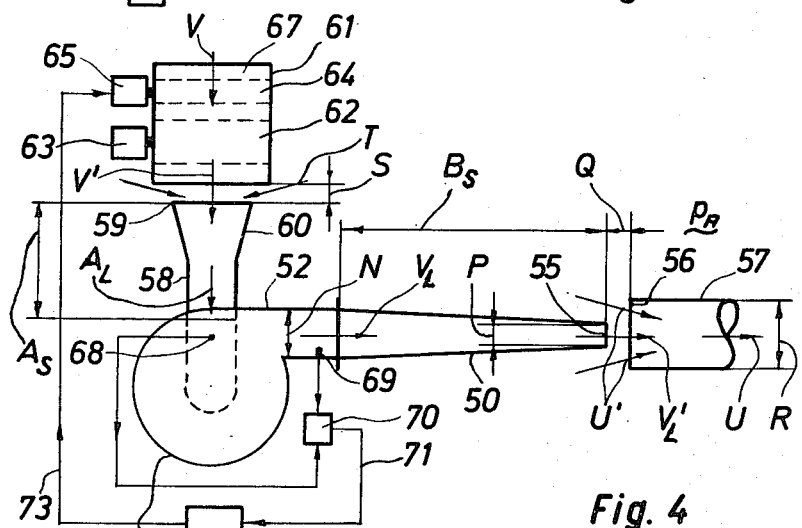
FIG. 4 is a schematic illustration of a further embodiment of apparatus for measuring and controlling fibre production.

In FIG. 4 there is shown a conical acceleration duct or tube 50 of circular cross-section. This duct 50 is connected with a connecting stud or connection 52 of a fan or ventilator 53. The acceleration duct 50 at its inlet end possesses a diameter N and at its outlet end 55 remote from the fan 53 a diameter P. Arranged facing the duct end 55 at a distance Q and coaxially thereto is the end 56 of a duct or pipe conduit 57 analogous to the arrangement shown in FIG. 3. The duct 56 is under the influence of a suction action and possesses a diameter R, so that again a transporting duct is formed consisting of the tubes 50 and 57 which are spaced from another i.e. interrupted by the distance Q.

A suction pipe or tube 58 arranged at the fan 53 is enlarged at its free end 59 into a feed or supply funnel 60 above which there is arranged at a distance S an opening and supply device 61 for fibrous material in such a manner that at the free end 59 of the suction tube 58 there prevails the atmospheric pressure $p_A$ of the surrounding air. The supply device 61 contains an opening roll 62 driven by a drive motor 63 and a pair of supply rolls 64 (one roll being visible) driven by a drive motor 65. An opening 67 is provided in the upper part of the supply device 64. A sensor or feeler 68 is arranged in the suction tube or pipe 58 and a measuring sensor or feeler 69 is arranged in the connecting stud or connection 52 for measuring the static pressure, both sensors being operably connected with a measurement transducer 70 for determining the difference between the measured static pressures. The measurement transducer 70 is connected via a conductor or line 71 with a control device 72 which can be designed like the control device 15 considered above in conjunction with FIG. 1, and which can be connected via a line 73 with the drive motor 65.

The apparatus functions as follows:

The ventilator or fan 53 sucks in air through the suction tube 58 from the surroundings i.e. from the room in which there prevails the constant higher pressure $p_A$, the air successively flowing in the directions indicated by the arrows T and $A_L$ via the suction tube 58 into the fan 53 and being expelled via the connecting stud or connection 52 in the direction of flow indicated by the arrow $V_L$ into the conical acceleration duct or tube 50. The air stream is accelerated within this acceleration tube 50 and at the end 55 thereof reaches an air speed $V'_L$. Through the duct or pipe conduit 57 air from the surrounding room flows in the direction indicated by the arrow U, this outside air being sucked-up in the direction indicated by the arrows U'. The fibre flocks received by the supply device 61 are entrained in the supply funnel 60 by the sucked-in air and in the suction tube 58 are accelerated over an acceleration zone or region $A_S$ to the air speed $A_L$. These fibre flocks are sucked through the fan 53 and expelled at the air speed $V_L$ from the connection 52 into the acceleration tube 50. Owing to the distance S provided between the supply device 61 and the supply funnel 60 it is possible to dispense with sealing of the supply device 61 against possible air through-flow with the material flow. Upon acceleration of the fibrous material over the acceleration zone $B_S$ to the speed of the air $V'_L$ the fibrous material is expelled at the duct end 55 and is further conveyed by the suction air stream U. Since at the end 59 of the suction tube 58 there prevails a constant static pressure, and if the parameters leading to falsified results are maintained constant, then there only occur changes in the static pressure in the suction air stream $A_L$ between the acceleration over the zone $A_S$ and the fan 53, i.e. the point of energy supply to the air stream, and which changes in static pressure are brought about by the acceleration of the fibrous material and detected by the feeler or sensor 68. Since at the end 55 of the acceleration tube 50 there also prevails a constant static pressure, and if the parameters leading to falsified results are eliminated, then again between the acceleration zone $B_S$ and the fan 53 there only occurs a change in the static pressure which is caused by the acceleration of the fibrous material and which is detected by the sensor or feeler 69. The relationship between the change in the static pressure and the production i.e. supply of fibrous material given by the above-mentioned equation is thus ensured for the acceleration in the suction tube 58 as well as for the acceleration in the acceleration tube 50. The measurement transducer 70 delivers to the control or regulating device 72 the difference between the values measured by the sensors 68 and 69, which corresponds to a change in the static pressure and thus to a shift in the operating point of the fan 53 along its characteristic line. The control device 72 processes this signal by determining the difference from a set point or reference value of the static pressure, the resulting value or magnitude depending upon the production i.e. the supply of the fibrous material. If such production deviates from the set point or reference value the speed of the drive motor 65 is corrected via the conductor or line 73 and the supply of the fibrous material is changed. By continuously measuring and forming the difference the supply of the conveyed fibrous material can be thus controlled in this manner.

Figure 5:
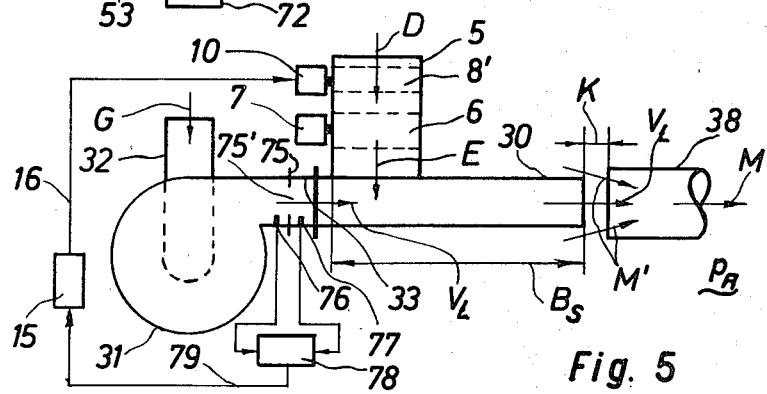
FIGS. 5 to 7 respectively schematically illustrate further embodiments of the apparatus according to FIG. 3 and FIG. 4 respectively.

In the arrangement of FIG. 5 wherein the same elements as shown in FIG. 3 have been designated by like reference characters, it will be seen that between the acceleration zone $B_S$ and the ventilator or fan 31 there is arranged a device in the connecting duct 33 for measuring the speed of the air, and which device can comprise a baffle 75 with a throughflow opening 75' for the air stream $V_L$ and, as viewed in the direction of flow, sensors 76 and 77 each arranged in front of and behind the baffle 75 for measuring the static pressures. The sensors or feelers 76 and 77 are operatively connected with a measurement transducer 78, which forms from the difference of the static pressures a control or regulating magnitude corresponding to the air speed. The air speed measured by the measurement transducer 78 is transmitted in the form of a signal via the line 79 to a control device 15, the details of which have been discussed previously in conjunction with the arrangement of FIG. 1. In the same manner as described for the static pressure with reference to FIG. 1, the control device 15 can control the supply of fibrous material as a function of the measuring value transmitted by the measuring transmitter 78, as the air speed $V_L$ changes, this change being caused by a change in the production i.e. supply of the fibre flocks infed in the direction of the arrow E.

Figure 6:
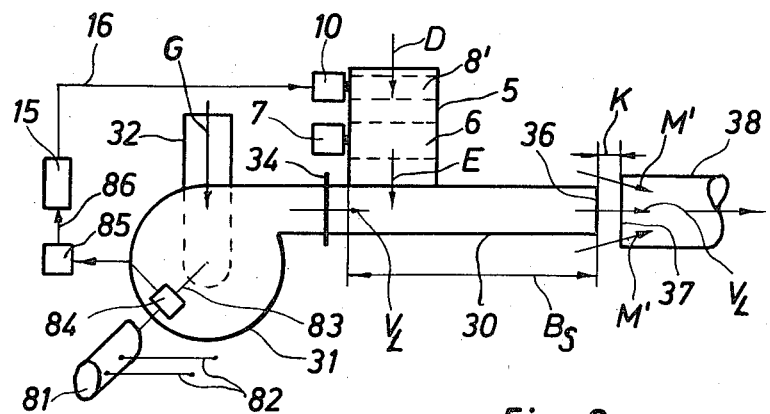

A possibility of detecting another measurement magnitude at the apparatus shown in FIG. 3 has been depicted in FIG. 6, the same elements being designated with the same reference characters used in FIG. 3. The ventilator or fan 31 is driven via a drive shaft 83 by means of an electric motor 81, which is equipped with energy supply connections 82 leading to a suitable source of electrical energy (not shown). Instead of the sensor 12 shown in FIG. 3 a device 84 for measuring the torque or rotational moment of the drive shaft 83 of the fan 31 is arranged on such drive shaft, i.e. at a point or location in the device for generating the air stream, i.e. at its energy supply thereof. The torque measuring device 84 is operatively connected with a measurement transducer 85 which is connected via a conductor or line 86 with the control device 15. If there occurs a change in the static and/or the dynamic pressure, caused by the acceleration of the fibrous material over the acceleration zone $B_S$, then there also changes the rotational moment transmitted by the shaft 83. The value or magnitude of the torque or rotational moment measured by the sensor 84 is transformed in the measurement transducer 85 into a signal which is transmitted to the control device 15 and which signal corresponds to the deviation of the rotational moment from the desired value, the production or supply of fibrous material being controlled as described above. The production thus also can be controlled based upon the measurement of a change in the torque or rotational moment.

Figure 7:
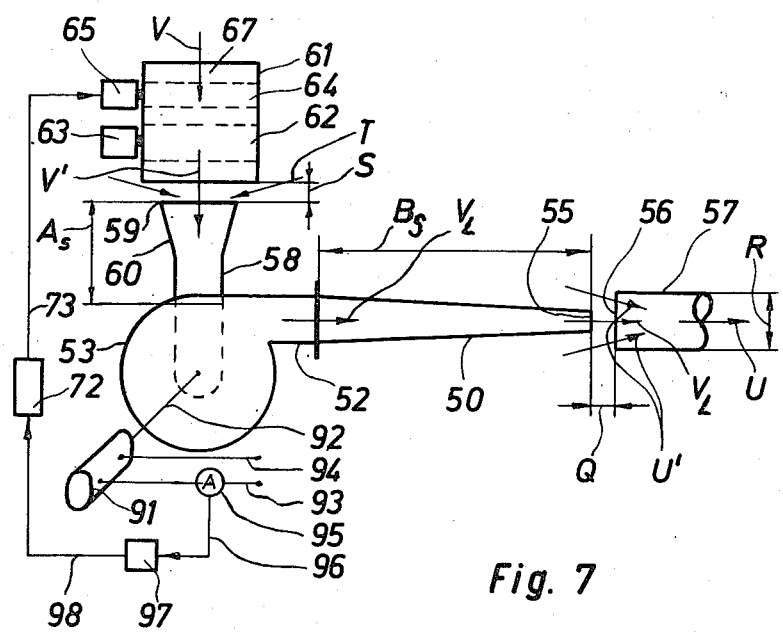

A further embodiment is shown in FIG. 7, elements shown identically as in FIG. 4 being designated by the same reference characters. An ammeter 95 is electrically connected into the supply line of the connection terminals 93 and 94 of a fan drive motor 91. The ammeter 95 is connected via a conductor or line 96 with a measurement transducer 97 which, in turn, is connected with the control device 72 previously considered with respect to the discussion of the embodiment of FIG. 4.

If, owing to a change in the static and/or the dynamic pressure brought about by the acceleration of the fibrous material over the acceleration zone $A_S$ or $B_S$ respectively, there occurs a change in the power consumption of the ventilator or fan 53, then this change can be detected or measured by measuring the current with the aid of the ammeter 95. The signal generated by the ammeter 95 is further processed as already previously discussed for the purpose of controlling the infeed or supply of the fibrous material.

Figure 8:
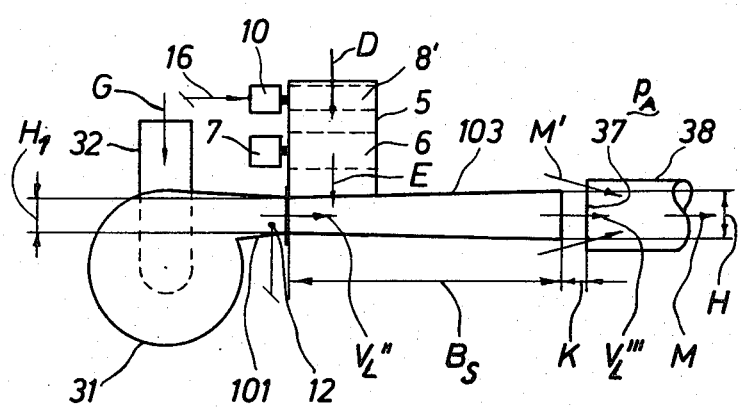
FIG. 8 illustrates another example of a part of the apparatus according to FIG. 3.

In FIG. 8 there is illustrated a portion of the embodiment shown in FIG. 3 including the ventilator or fan 31 with a connecting stud or connection 101 of circular cross-section which, as viewed in the direction of the air flow $V_L''$ conically tapers to a diameter $H_1$. An acceleration duct or tube 103 is connected with the connection 101 and such duct 103 enlarges to a diameter H. Owing to the enlargement of the acceleration duct or tube 103 for the fibrous material it is possible to reduce the influence of the friction of the fiber flocks on the wall of the tube 103 and thus there can be avoided a disturbing influence upon the static and/or on the dynamic pressure. The relationship between the static and/or the dynamic pressure and the production or supply of fibrous material thus can be additionally ensured for in this manner. Owing to the conical design or taper of the connecting stud or connection 101 the air speed is increased to the velocity $V_L''$ compared to the air speed $V_L$ described with reference to FIG. 3, so that the difference between the measured values can be advantageously increased at the sensor or feeler 12. Owing to the enlargement of the fibrous material acceleration duct or tube 103 the air speed $V_L'''$ at its free end 104 is lower than the air speed $V_L''$.

Figure 9:
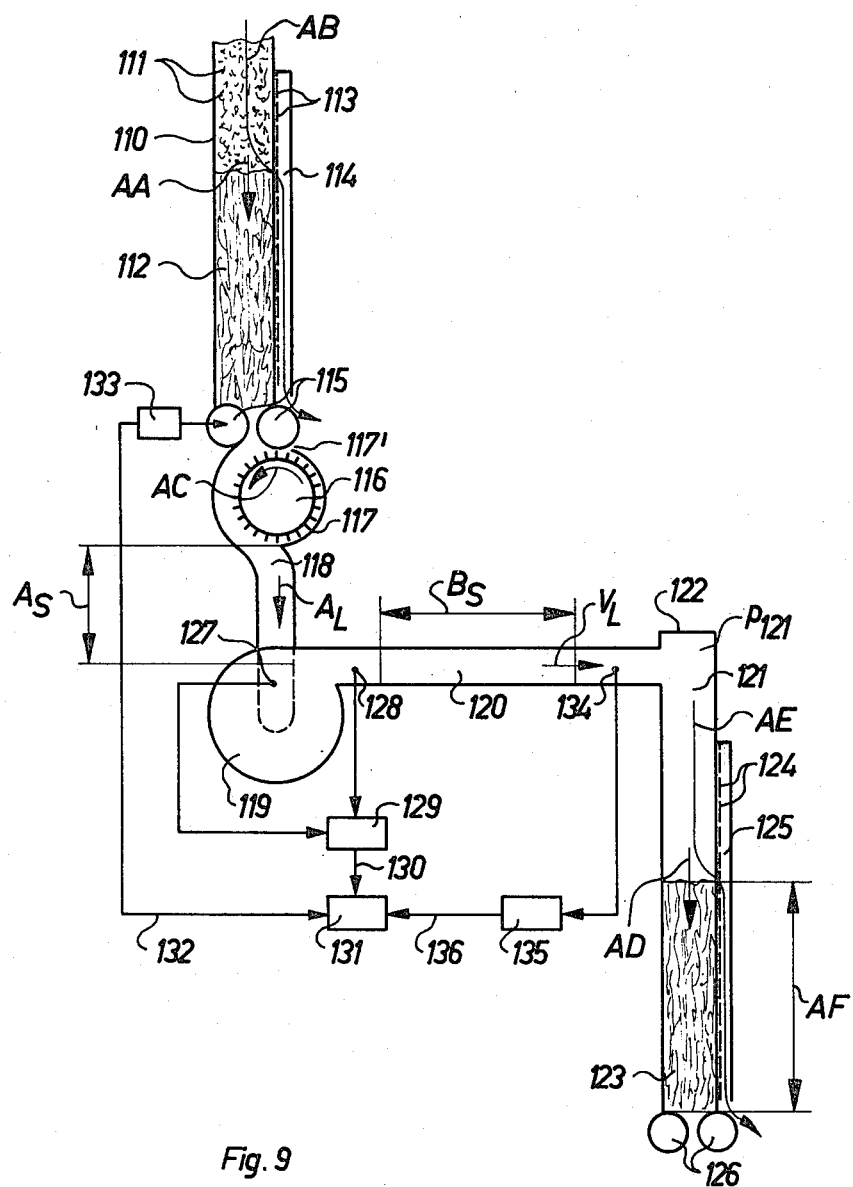
FIG. 9 illustrates a further embodiment of apparatus.

According to the showing of FIG. 9 within a filling or feed chute 110 a pneumatically infed, loosened or opened fibrous material 111 is deposited in the direction of the arrow AA as a fiber mass 112 while separating such from the transporting air stream, which flows-off in the direction of the arrow AB through a perforated partition or separation wall 113 into a parallelly extending flow chute or channel 114. At the lower end of the filling chute 110 the fibrous material is withdrawn between a pair of oppositely rotating, driven rolls 115 and delivered in the direction of the arrow AC to the driven opening roll or roller 116 which is surrounded by housing 117 having an opening 117' which is at atmospheric pressure. In a suction tube 118, merging with the housing 117 of a ventilator or fan 119, the loosened fibrous material is accelerated away from the opening roll 116 through the suction air thereof along an acceleration path or zone $A_S$ to the air velocity $A_L$ conveyed through the fan or ventilator 119 and ejected into a transport duct or conduit 120, where it is accelerated along an acceleration path $B_S$ to the air velocity $V_L$. Thereafter, the fibrous material is deposited into a filling or feed chute 121, with which communicates by means of a head 122 the end of the transport conduit which faces away from the ventilator or fan 119, the fibrous material being conveyed in the direction of the arrow AD as a fiber mass 123 while separating-out the transporting air stream, which flows away in the direction of the arrow AE through a perforated partition or separation wall 124 of the filling chute 121 into a parallelly extending flow chute or channel 125. At the lower end of the filling chute 121 there are arranged a pair of oppositely driven withdrawal rolls 126, which withdraw the fiber mass 123 in the form of cotton for presentation to a suitable spinning preparatory machine which has not been particularly shown. For reasons of clarity in illustration, the fibrous material has not been shown as it moves from the withdrawal rolls 115 until reaching the filling chute 127.

A measuring feeler or sensor 127 arranged between the acceleration path $A_S$ and the ventilator or fan 119 in the suction tube 118 and a measuring feeler or sensor 128 arranged between the ventilator or fan 119 and the acceleration path $B_S$ in the transport conduit or duct 120, serve for measuring the static pressure and are connected with a measuring transducer 129 for determining the difference of the static pressures. By means of a conductor or line 130 the measuring transducer 129 is connected with a control or regulator device 131, which, in turn, is connected by a line or conductor 132 with a drive 133 for the pair of withdrawal rolls 115. Owing to the constant static pressure which prevails at the opening 117', and while maintaining constant the remaining parameters of the measuring feeler 127, there are only detected changes of the static pressure due to acceleration of the fibrous material along the acceleration path $A_S$. The fibrous material and the air current in the transport duct or conduit 120 are conveyed however against a varying pressure $p_{121}$, because the height AF of the deposited fiber mass 123 in the filling chute 121 can vary as a function of, for instance, the removal by the withdrawal rolls 126, so that the measuring feeler or sensor 128 detects the sum of the pressures in the transport conduit 120. In order to take into account these pressure fluctuations, there is provided in the transport conduit or duct 120 following the acceleration path $B_S$, a further measuring feeler 134 which is connected by means of a measuring transducer 135 through the agency of a line 136 with the regulation or control device 131. By means of the measuring feeler 134 the pressure fluctuations which arise following the acceleration path $B_S$ are detected and as to the value measured by means of the measuring sensor or feeler 128 such is subtracted in the regulation device 131 which is structured for this purpose, and can be otherwise constructed as to its remaining components in the manner of the regulation or control device 15 of FIG. 1. Thus, the regulation device 131 then produces a signal which corresponds to a static pressure and thus an operating condition of the ventilator or fan 119, which is solely dependent upon the acceleration of the fibrous material and constitutes a measure of the production of fibrous material, provided that all other parameters exerting a disturbing effect upon the measurement value at the sensor or feeler 128 are retained constant.

Figure 10A:
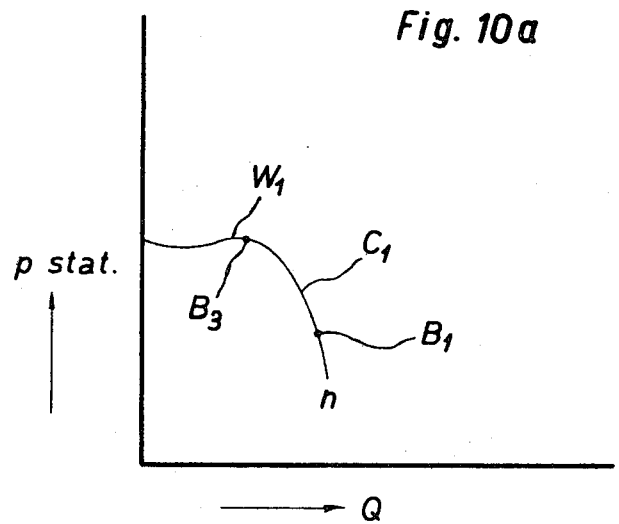
FIGS. 10a and 10b are graphs each portraying the characteristics of a ventilator or fan.
Figure 10B:
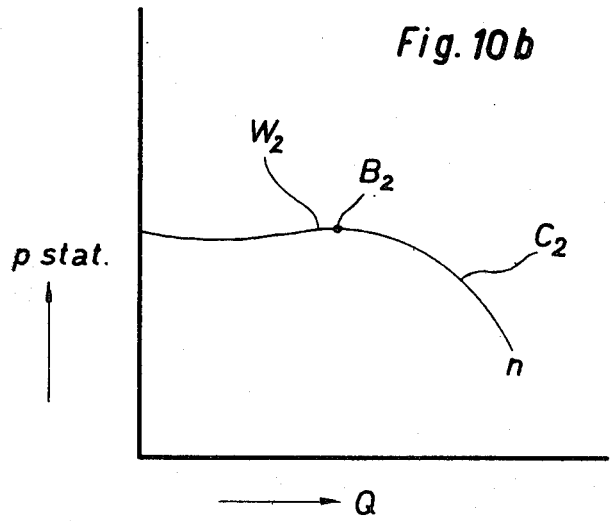

FIGS. 10a and 10b respectively show graphs of a characteristic line or curve $C_1$ and $C_2$ of a respective fan or ventilator, portraying the relationship of the static pressure $p_{stat.}$ (in kilograms per square meter) plotted along the ordinate for a given rotational speed n (in revolutions per minute) of the employed ventilator or fan as a function of the transported volume Q (in cubic meters per second) plotted along the abscissa. Since as is known the transported or conveyed volume Q depends upon the air speed and thus upon the dynamic pressure, the characteristic lines $C_1$ and $C_2$ also provide a relationship between the static pressure p and the dynamic pressure.

The optimal efficiency of each of the fans in the indicated graphs has been shown by the portions $W_1$ and $W_2$ of the characteristic lines $C_1$ and $C_2$ respectively.

The characteristic line $C_1$ according to the illustration of FIG. 10a shows a course for this ventilator or fan wherein over a steeply descending part of the characteristic line $C_1$ the transported volume Q and thus the dynamic pressure show little change as the pressure p changes. A shift in the operating point $B_1$ of the fan or ventilator over the steeply descending part of the characteristic line $C_1$ thus results in a negligibly small change in the transported or conveyed volume, but leads to a larger change in pressure, i.e. a small change in the production or supply of fibrous material causes a larger change in the static pressure. The measurement or the control of the production as a function of the change in the static pressure, according to the embodiments described above with reference to FIGS. 1 through 4, 6 and 8 is thus particularly advantageous if a fan is used having the characteristic line $C_1$, at which there can be chosen the operating point along the steeply ascending portion of the characteristic line.

The characteristic line $C_2$ shown in FIG. 10b for another fan, on the other hand, portrays a course having an almost horizontally extending portion followed by a gently or slightly descending portion in which the static pressure p changes very little with a change in the transported or conveyed volume Q. The shift of the operating point $B_2$ of the fan along the horizontal part of the characteristic line $C_2$ thus results in a large change in the transported volume Q and a negligibly small change of the static pressure, $\Delta p$. The fan or ventilator with the characteristic line $C_2$ thus can be used for the measurement or control of the production as a function of the change in the air speed according to the embodiments described with reference to FIGS. 5 or 7, since the operating point of the fan can be chosen along the horizontal part of the characteristic line $C_2$.

The characteristic line $C_1$ according to the illustration in FIG. 10a furthermore shows that on the curve portion $W_1$ the shift of the operating point changes the value of the static pressure as well as that of the dynamic pressure. The operating point on the curve portion $W_1$ of the characteristic line $C_1$ thus can be advantageous for the measurement or the control respectively, of the production as a function of the change in the static pressure and the dynamic pressure if an operating point $B_3$ on the portion $W_1$ is desired for optimum efficiency.

The inventive method not only possesses the advantage that the production or supply of fibrous material can be detected and measured at the entire fibrous material being transported, but also that the production can be controlled as a function of the quantity being transported. The method can be applied to the blending of fibrous materials, in which case the blend components are individually metered according to the inventive method. In this case a plurality of apparatuses according to the invention can be connected with a common collector duct or conduit and the fibrous materials, the production of which is individually controlled in each apparatus, can be delivered into the common collector duct where it then can be mixed. The inventive method, however, can be used for controlling the production to be fed to spinning preparatory machines, e.g. to cards. A further advantage of the inventive method resides in the fact that it can be applied in plants heretofore used for pneumatically transporting fibrous material which necessitate a controllable supply, by simply separating a pneumatic transporting duct into an acceleration part and into a part for further transporting the material and in which arrangement the method aspects of the invention can be implemented. According to the invention the mass of the fibrous material is not measured by weighing, but is detected from the inertia properties of the mass of the fibrous material as it is accelerated. The use of the change of the static and/or the dynamic pressure caused by the acceleration as a measure of the production or supply of pneumatically transported fibrous material constitutes a method of utmost simplicity and economic feasibility since no moving parts are required and thus there does not occur any wear in the plant or machine and there are not required any major alterations or changes in already existing plants or installations.

While there are shown and described present preferred embodiments of the invention, it is to be distinctly understood that the invention is not limited thereto, but may be otherwise variously embodied and practiced within the scope of the following claims. Accordingly,

What we claim is:

1. A method for maintaining substantially constant a quantity of opened fibrous material delivered per unit of time, to a spinning preparatory machine, comprising the steps of:
    (a) generating a conveying air stream by means of a fan having a characteristic diagram;
    (b) flowing the conveying air stream into a transporting duct for the fibrous material;
    (c) supplying the fibrous material into the transporting duct in such manner that the material is accelerated by the conveying air stream and a change in the quantity of material accelerated per unit time causes a corresponding change in the operating condition of the fan as represented by said characteristic diagram;
    (d) delivering the accelerated fibrous material within the duct in the direction of the spinning preparatory machine;
    (e) measuring a parameter which is characteristic for the operating condition of the fan;
    (f) comparing the measured parameter with a set value parameter corresponding to a desired operating condition of the fan and hence to a desired quantity of opened fibrous material which is to be delivered per unit of time to the spinning preparatory machine;
    (g) upon deviation of the measured parameter from the set value parameter, adjusting the further supply of fibrous material into the transporting duct until re-establishing a supply of fibrous material to said spinning preparatory machine corresponding to the substantially constant quantity of opened fibrous material desired to be delivered to the spinning preparatory machine;
    wherein the characteristic parameter which is measured is the drive moment of the fan.

2. The method as defined in claim 1, wherein the characteristic parameter which is measured is the torque of the fan.

3. A method for maintaining substantially constant a quantity of opened fibrous material delivered per unit of time, to a spinning preparatory machine, comprising the steps of:
    (a) generating a conveying air stream by means of a fan having a characteristic diagram;
    (b) flowing the conveying air stream into a transporting duct for the fibrous material;

(c) supplying the fibrous material into the transporting duct in such manner that the material is accelerated by the conveying air stream and a change in the quantity of material accelerated per unit time causes a corresponding change in the operating condition of the fan as represented by said characteristic diagram;

(d) delivering the accelerated fibrous material within the duct in the direction of the spinning preparatory machine;

(e) measuring a parameter which is characteristic for the operating condition of the fan;

(f) comparing the measured parameter with a set value parameter corresponding to a desired operating condition of the fan and hence to a desired quantity of opened fibrous material which is to be delivered per unit of time to the spinning preparatory machine;

(g) upon deviation of the measured parameter from the set value parameter, adjusting the further supply of fibrous material into the transporting duct until re-establishing a supply of fibrous material to said spinning preparatory machine corresponding to the substantially constant quantity of opened fibrous material desired to be delivered to the spinning preparatory machine;

wherein the characteristic parameter which is measured is a value of the power drawn by the fan.

4. The method as defined in claim 3, including the step of measuring an electrical power take-up of an electrical motor which drives the fan.

5. An apparatus for maintaining substantially constant a quantity of fibrous material which is in the process of being transported by an air stream and delivered per unit of time to a spinning preparatory machine, comprising:

(a) a pneumatic transporting duct;

(b) a fan having a characteristic diagram and operatively connected with the pneumatic transporting duct for generating an air stream moving through the pneumatic transporting duct;

(c) a supply device for feeding fibrous material into the transporting air stream;

(d) said transporting duct comprising an acceleration zone for the fibrous material, the one end of the acceleration zone being in communication with the fan so that a change in the quantity of material accelerated per unit time causes a corresponding change in the operating condition of the fan as represented by said characteristic diagram;

(e) a measuring device arranged for measuring a parameter which is characteristic for the operating condition of the fan;

(f) a control device operatively connected with the supply device and said measuring device;

(g) the control device including means for producing a value by comparing the measured parameter with a set value parameter corresponding to a desired fan operating condition and hence to a desired quantity of opened fibrous material which is to be delivered per unit of time to the spinning preparatory machine and for adjusting the further supply of fibrous material into the transporting duct in dependence upon said value until re-establishing a supply of fibrous material to said spinning preparatory machine corresponding to the substantially constant quantity of opened fibrous material desired to be delivered to the spinning preparatory machine; and (h) said fan for generating the air stream possesses a drive shaft, said measuring device serving to measure a rotational moment of said fan and being arranged to the drive shaft thereof.

6. An apparatus for maintaining substantially constant a quantity of fibrous material which is in the process of being transported by an air stream and delivered per unit of time to a spinning preparatory machine, comprising:

(a) a pneumatic transporting duct;

(b) a fan having a characteristic diagram and operatively connected with the pneumatic transporting duct for generating an air stream moving through the pneumatic transporting duct;

(c) a supply device for feeding fibrous material into the transporting air stream;

(d) said transporting duct comprising an acceleration zone for the fibrous material, the one end of the acceleration zone being in communication with the fan so that a change in the quantity of material accelerated per unit time causes a corresponding change in the operating condition of the fan as represented by said characteristic diagram;

(e) a measuring device arranged for measuring a parameter which is characteristic for the operating condition of the fan;

(f) a control device operatively connected with the supply device and said measuring device;

(g) the control device including means for producing a value by comparing the measured parameter with a set value parameter corresponding to a desired fan operating condition and hence to a desired quantity of opened fibrous material which is to be delivered per unit of time to the spinning preparatory machine and for adjusting the further supply of fibrous material into the transporting duct in dependence upon said value until re-establishing a supply of fibrous material to said spinning preparatory machine corresponding to the substantially constant quantity of opened fibrous material desired to be delivered to the spinning preparatory machine; and (h) an electric motor for driving said fan, an electrical supply circuit for said electric motor, said measuring device serving to measure an electrical power take-up of the electric motor driving the fan and being arranged in the electrical supply circuit of the electric motor.

7. An apparatus for maintaining substantially constant a quantity of fibrous material which is in the process of being transported by an air stream and delivered per unit of time to a spinning preparatory machine, comprising:

(a) a pneumatic transporting duct;

(b) a fan having a characteristic diagram and operatively connected with the pneumatic transporting duct for generating an air stream moving through the pneumatic transporting duct;

(c) a supply device for feeding fibrous material into the transporting air stream;

(d) said transporting duct comprising an acceleration zone for the fibrous material, the one end of the acceleration zone being in communication with the fan so that a change in the quantity of material accelerated per unit time causes a corresponding change in the operating condition of the fan as represented by said characteristic diagram;
(e) a measuring device arranged for measuring a parameter which is characteristic for the operating condition of the fan;
(f) a control device operatively connected with the supply device and said measuring device;
(g) the control device including means for producing a value by comparing the measured parameter with a set value parameter corresponding to a desired fan operating condition and hence to a desired quantity of opened fibrous material which is to be delivered per unit of time to the spinning preparatory machine and for adjusting the further supply of fibrous material into the transporting duct in dependence upon said value until re-establishing a supply of fibrous material to said spinning preparatory machine corresponding to the substantially constant quantity of opened fibrous material desired to be delivered to the spinning preparatory machine;

wherein said transporting duct comprises an acceleration tube having a first end operatively connected with the fan generating the air stream and a free end opening into a region at which there prevails a substantially constant pressure;

wherein said transporting duct comprises said acceleration tube and a tubular duct, said tubular duct having a free end, the free end of said acceleration tube being arranged in confronting spaced relationship from said free end of said tubular duct.

* * * * *